US010007932B2

(12) United States Patent
O'Connor et al.

(10) Patent No.: US 10,007,932 B2
(45) Date of Patent: Jun. 26, 2018

(54) SYSTEM AND METHOD FOR CREATION OF VISUAL JOB ADVERTISEMENTS

(71) Applicant: VIZIRECRUITER LLC, Troy, MI (US)

(72) Inventors: Joseph J. O'Connor, Bloomfield Hills, MI (US); Patrick J. Frenzel, Bloomfield Hills, MI (US)

(73) Assignee: VIZIRECRUITER LLC, Troy, MI (US)

(*) Notice: Subject to any disclaimer, the term of this patent is extended or adjusted under 35 U.S.C. 154(b) by 196 days.

(21) Appl. No.: 15/200,287

(22) Filed: Jul. 1, 2016

(65) Prior Publication Data

US 2017/0004544 A1    Jan. 5, 2017

Related U.S. Application Data

(60) Provisional application No. 62/187,464, filed on Jul. 1, 2015.

(51) Int. Cl.
*G06Q 30/02*      (2012.01)
*G06F 17/27*      (2006.01)

(52) U.S. Cl.
CPC ....... *G06Q 30/0276* (2013.01); *G06F 17/271* (2013.01)

(58) Field of Classification Search
CPC ................................................ G06Q 30/0276
See application file for complete search history.

(56) References Cited

U.S. PATENT DOCUMENTS

| 5,598,557 | A | * | 1/1997 | Doner ............... G06F 17/30687 |
| 6,044,365 | A | * | 3/2000 | Cannon ............. G06F 17/30017 |
| | | | | 707/741 |
| 2006/0248480 | A1 | | 11/2006 | Faraday et al. |
| 2009/0254557 | A1 | | 10/2009 | Jordan |
| 2010/0050097 | A1 | | 2/2010 | McGreevy et al. |
| 2010/0114789 | A1 | * | 5/2010 | Dane ...................... G06Q 10/06 |
| | | | | 705/321 |
| 2011/0055919 | A1 | | 3/2011 | Hamilton, II et al. |
| 2012/0265770 | A1 | | 10/2012 | Desjardins et al. |
| 2013/0066796 | A1 | * | 3/2013 | Shin ............... G06Q 10/063118 |
| | | | | 705/321 |
| 2015/0199647 | A1 | * | 7/2015 | Shin ................... G06Q 10/1053 |
| | | | | 705/321 |
| 2015/0293887 | A1 | * | 10/2015 | H ......................... G06Q 10/105 |
| | | | | 715/249 |

(Continued)

FOREIGN PATENT DOCUMENTS

| WO | WO-8804454 A2 | * | 6/1988 | ....... G06F 17/30678 |
| WO | WO-2014099715 A1 | * | 6/2014 | ........... G06Q 10/105 |

*Primary Examiner* — Jacob C Coppola
(74) *Attorney, Agent, or Firm* — Carlson, Gaskey & Olds, P.C.

(57) ABSTRACT

This disclosure relates to a system and method for creating a job advertisement. The job advertisement includes visual information which is presented an in organized, easily digestible manner. An example system according to the present disclosure includes, among other things, a first computing device a second computing device in communication with the first computing device. The second computing device is configured to receive an input of text describing a job from the first computing device and create a job advertisement including at least one image representative of at least a portion of the text.

7 Claims, 6 Drawing Sheets

(56) References Cited

U.S. PATENT DOCUMENTS

2015/0347975 A1* 12/2015 Kelly ................. G06Q 10/1053
  705/321
2016/0125451 A1* 5/2016 Garg ................. G06Q 30/0243
  705/14.42

* cited by examiner

REQUIREMENTS

EXPERIENCE 
5-years working experience in BTB digital marketing. Demonstrable experience leading and managing SEO/SEM, marketing database, email, social media...

MARKETING
Up-to-date with the latest trends and best practices in online marketing and measurement

DEGREE
BS/MS degree in marketing or a related field

KNOWLEDGE 
Solid knowledge of website analytics tools (e.g., Google Analytics, Netinsight, Omniture, Web Trends)

CREATIVE 
Highly creative with experience in identifying target audiences and devising digital campaigns that engage, inform and motivate

SYSTEM AND METHOD FOR CREATION OF VISUAL JOB ADVERTISEMENTS

RELATED APPLICATIONS

This application claims the benefit of U.S. Provisional Application No. 62/187,464, filed Jul. 1, 2015, the entirety of which is herein incorporated by reference.

BACKGROUND

This disclosure relates to a system and method for creating visual job advertisements (which also may be referred to as "job ads" or "job postings").

The Internet has become a primary source for individuals seeking new employment. When searching for new employment, individuals typically enter keywords into a search engine, and are directed to various job postings on company websites or third party websites such as Monster.com. These job postings are largely, if not completely, text-based, typically because a job posting is a legal description of a position. Users are required to sort through the text to determine whether the job posting fits their particular skill set. However, in lieu of taking the time to understand the text, some users will overlook job postings that would have been applicable to them. On the other hand, some users will simply apply to a job regardless of whether they are truly interested or qualified.

SUMMARY

This disclosure relates to a system and method for creating a job advertisement. The job advertisement includes visual information which is presented an in organized, easily digestible manner. An example system according to the present disclosure includes, among other things, a first computing device a second computing device in communication with the first computing device. The second computing device is configured to receive an input of text describing a job from the first computing device and create a job advertisement including at least one image representative of at least a portion of the text.

BRIEF DESCRIPTION OF THE DRAWINGS

The drawings can be briefly described as follows.

DETAILED DESCRIPTION

This disclosure relates to a system and method for creating a job advertisement. The job advertisement includes visual information which is presented an in organized, easily digestible manner.

Figure 1:
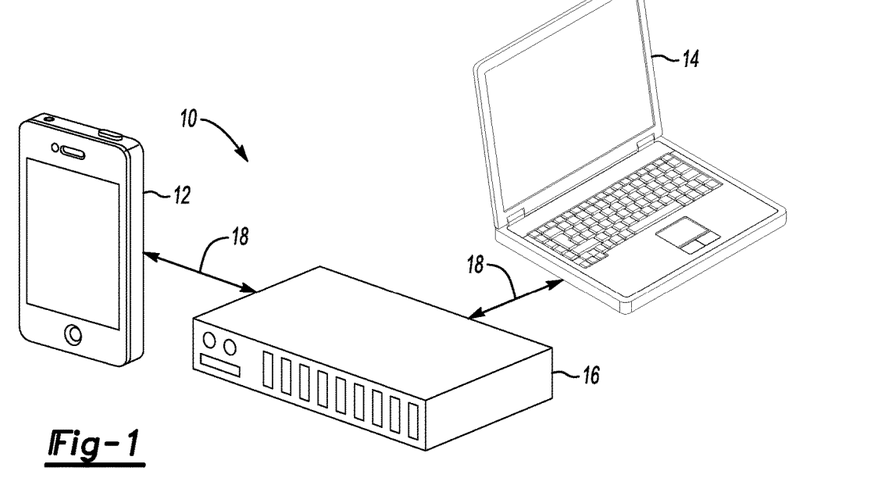
FIG. 1 is a highly schematic view of an example system according to this disclosure.

FIG. 1 is a highly schematic view of an example system 10 for creating a visual job advertisement or posting. In particular, the system 10 and method of this disclosure are configured to automatically generate visual or graphic-based job ads that generally resemble "infographics" or "web graphics." Infographics or web graphics are visual representations of information and data. In this disclosure, the job postings contain visual information relating to a particular position.

In one example, the system 10 includes a first computing device 12, a second computing device 14, and a third computing device 16. As shown in FIG. 1, the first computing device 12 is a mobile computing device, such as a tablet or a smartphone. The second computing device 14 is a laptop or another computer, and the third computing device 16 is a computing device including a server. Relative to the third computing device 16 in particular, while shown as a single server, the third computing device 16 can be implemented using multiple components at various locations. The first, second, and third computing devices 12, 14, 16 are illustrated for purposes of explanation, and should not be considered as limiting regarding the type or number of computing devices used for generating job postings in a manner consistent with the disclosed system.

In this example, the first, second, and third computing devices 12, 14, 16 are in communication with each other as schematically shown via a connection 18, which may be a wireless link or other connection, such as those used to access the Internet. Each of the first, second, and third computing devices 12, 14, 16 may include memory, hardware, and software, and be configured to communicate with one another and transmit data between one another. The first, second, and third computing devices 12, 14, 16 may further be configured to store information and data, and send and receive instructions to one another to execute the methodology described below.

Figure 2:
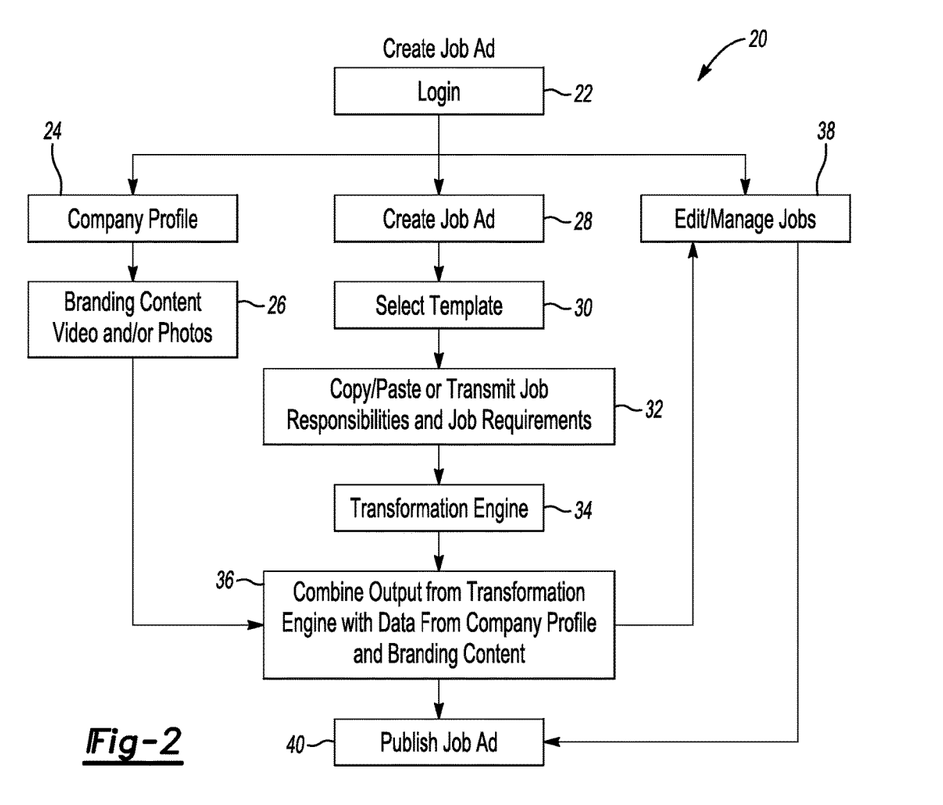
FIG. 2 is a flow chart representative of an example method according to this disclosure.

FIG. 2 illustrates an example method 20 of generating a job posting. The method 20 can be used to create and manage any number of job ads specific to a particular user. An example user is a company or, more particularly, a recruiter, human resources representative, or hiring manager of the company. In the method 20, the user first logs in, at 22, to a job ad creation service hosted on the third computing device 16, for example. In the example, the user may be logging in to the service using the second computing device 14.

At 24, the user has the opportunity to create, or edit, a company profile associated with its job postings. The company profile can include information such as a company logo and a company description. For example, at 26, the user can upload branding content including videos and/or photos associated with the company. The company profile can be stored on the third computing device 16 and used for multiple job ads. That is, the user is not required to create a new company profile with the creation of each job ad. However, the user can edit the company profile as necessary. The company profile information is useful for customizing the job ads of that company such that they have the look and feel of the particular company. In other examples, the user does not create a company profile. In that case, a user can select a profile from a bank of generic profiles stored on the third computing device 16.

Next, at 28, the user begins creating a job ad. At 30, the user may select a template for the job ad. The template may be a template infographic, which may contain background graphics, and generally show the user the proposed layout of the job ad. The template may include fields such as "Job Summary," "Responsibilities," "Requirements," "About Company," "Job Title," "Image 1," "Image 2," "Visual 1," "Video 1," etc. The template is an HTML5 animated template in one example. The user may select from one of a plurality of templates stored on the third computing device 16. The user can also customize or edit the stored templates.

In addition to selecting a template, the user provides an input of text at 32, which is the text of the job description. In one example, the user can copy and paste the text from an already-existing text document, such as a Microsoft Word™ document, or the user can upload a document containing the text. Alternatively, the user may have already created a job posting on an internal, company website or via a third party job posting service such as Monster.com. The user can copy and paste the text from the job posting as the text input. The text of the job description will generally include the job responsibilities and requirements, as well as other information related to the particular position.

Figure 3:
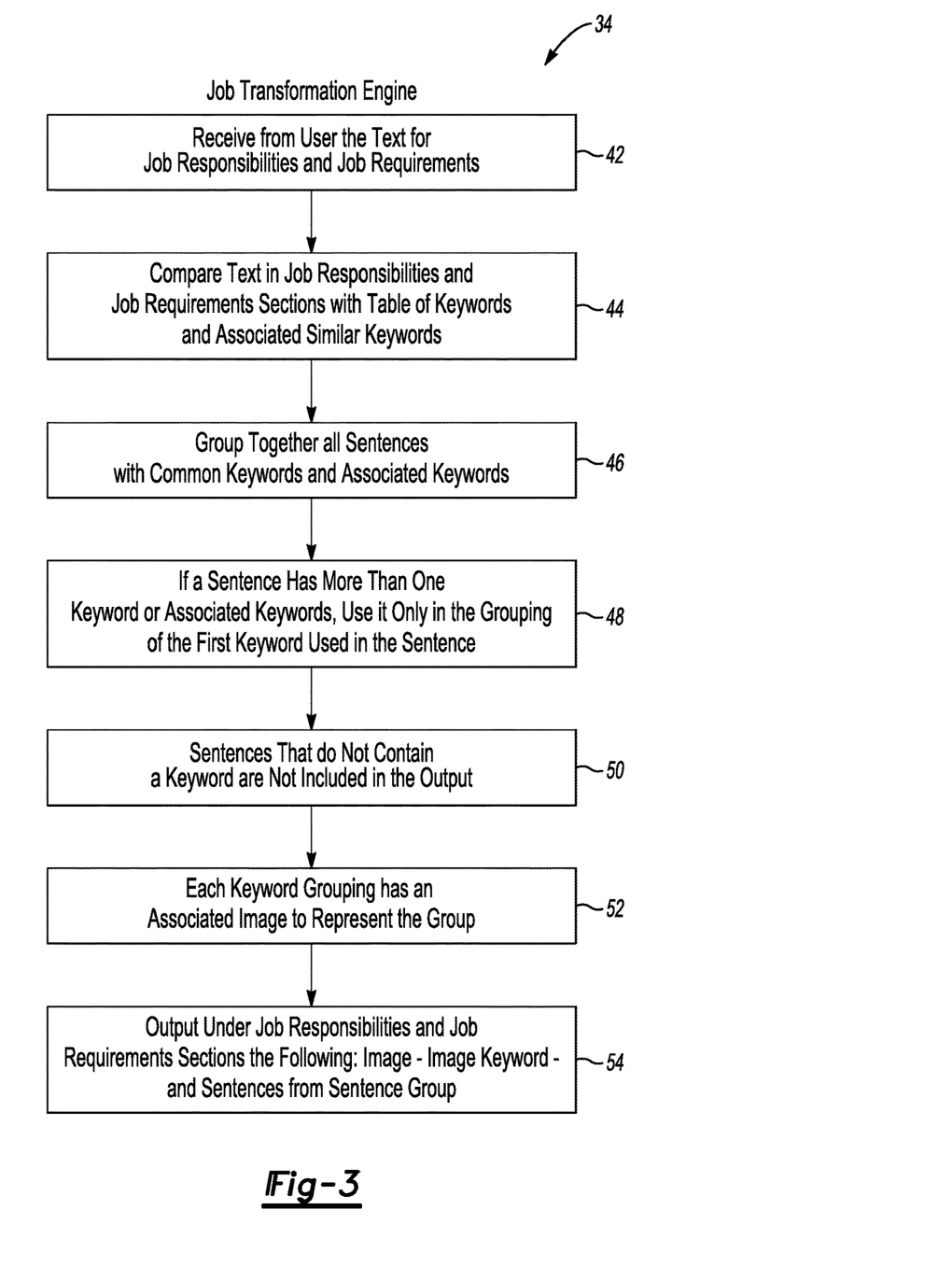
FIG. 3 is a flow chart representative of an aspect of the method of FIG. 2.

After 32, the text relating to the job description is submitted to a transformation engine 34, which is a program executed on the third computing device 16. The transformation engine 34, which will be described in detail with reference to FIG. 3, is configured to essentially automatically convert the text of the job description into a format containing images and/or visuals for use in the job posting. The output of the transformation engine 34 is applied to the template and merged, at 36, with the company profile.

The user is allowed to edit all job postings it has created, at 38. Once satisfied that a particular job posting is ready to publish, the posting is published, at 40. The job posting provides applicants with highly relevant information regarding the position in an easily digested format. Further, creation of the job posting is relatively easy as a large portion of work is done by the third computing device 16 using the transformation engine 34.

In one example, the third computing device 16 includes a server that hosts the job ad. In that example, the user is provided with a URL specific to a particular job ad. The user can post the URL on a social media page, such as Twitter or Facebook, for potential job applicants to view. A potential job applicant can access the job ad via a mobile device such as the first computing device 12, for example, by selecting the URL. The job ad may contain another URL linking back to the user's website where the job applicant can submit an actual job application.

FIG. 3 is a flow chart schematically illustrating the detail associated with the transformation engine 34. In this example, the transformation engine 34 comprises a program executed by the third computing device 16. After the user inputs text describing a particular job posting via the second computing device 14, at 32 (FIG. 2), the third computing device 16 receives that text at 42.

In this example, the third computing device 16 contains a table of keywords and associated keywords that have been previously identified as pertaining to particular jobs or job types. Since there are a number of ways to describe a particular position, the table is useful for grouping common themes in the job posting together. For instance, the table of keywords may include, for a software engineering position, a term such as "develop." For the term "develop," associated keywords may include "program" or "code." There may be additional keywords that account for differences in language (such as American English versus British English). Another keyword may be "networking." For "networking," associated keywords may include "communications" or "local area network."

At 44, the transformation engine 34 parses the input text, finds all of the keywords and associated keywords in the input, and determines the number of occurrences of each keyword and associated keyword. At 46, all sentences having common keywords and associated keywords are grouped together into a common sentence group. At 48, to avoid duplicating information in the job ad, if a sentence has more than one keyword or associated keyword, only the first-occurring keyword or associated keyword (i.e., the keyword coming first in a particular sentence) is used for purposes of grouping. At 50, sentences that do not contain a keyword are essentially ignored, and excluded for purposes of generating the visual or graphic-based output.

At 52, each sentence group is assigned an associated image, which represents the keyword and any associated keywords in the sentence group. The third computing device 16 includes memory that stores a number of different images, and the transformation engine 34 is configured to associate a particular image with a particular keyword. For instance, for the keyword "develop," the transformation engine 34 assigns an image of an individual typing into a computer. At 54, the transformation engine provides an output of an image, an image keyword, and the sentences within the sentence group. For example, instead of presenting a user with several sentences that describe software development, the output of the transformation engine 34 provides an image of a computer programmer, with the term "Develop," and a few lines of text derived from the sentences in the sentence group (e.g., "programming in C++," or "coding to meet client requirements"). This information is then input into the template selected at step 30, and is combined with the company profile at step 36 to create the job ad.

The job posting created using the disclosed system and method provides applicants with highly relevant information in an easily digested format. Further, creation of the job posting is relatively easy as a large portion of work is done by the third computing device 16 and, in particular, the transformation engine 34. The benefits provided by the example system and method become even more apparent to relatively large companies that may be creating and managing hundreds or even thousands of job postings at any given time.

FIGS. 4A-4E illustrate an example visual job advertisement 56 created using the system and method discussed above. The visual job advertisement 56 is presented to the user, in this example, as a single web page, or within an app, in which the user can scroll or use radio buttons 57 to navigate to different sections of the visual job advertisement 56. In this example, there are five radio buttons 57 corresponding to summary, overview, responsibilities, requirements, and about us sections of the visual job advertisement 56.

Figure 4A:
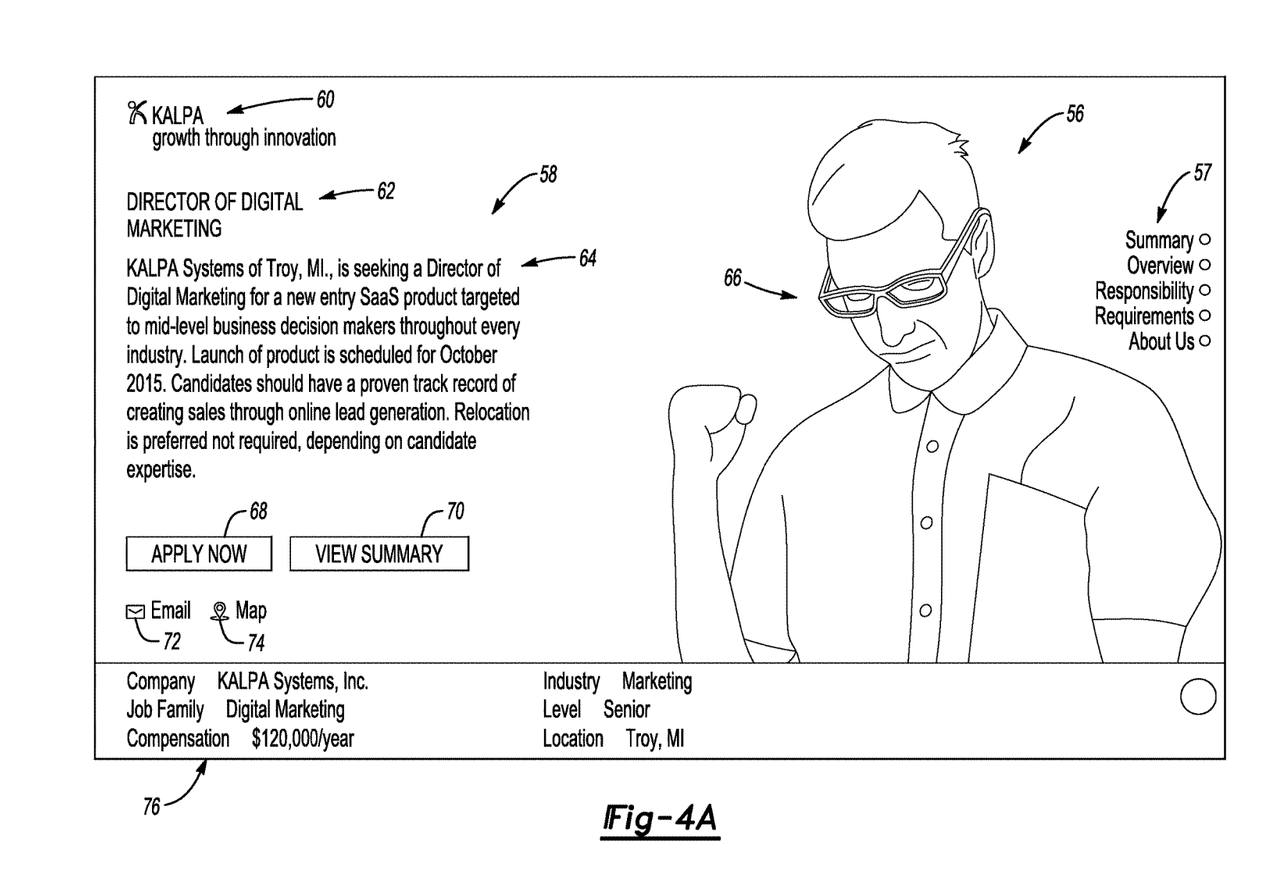
FIG. 4A is a view of a first aspect of an example visual job advertisement.

FIG. 4A illustrates an example summary section 58 of the visual job advertisement 56. The summary section 58 includes a company logo 60, a job title 62, and a brief description 64 of the job. The summary section 58 also includes a graphic 66, an "apply now" button 68, and a "view summary" button 70. The "apply now" button 68 directs the user away from the visual job advertisement 56 to a website (such as a company's HR website) where they can apply for the job. Using the "view summary" button 70, the user is also directed to the company website to view the company's version of the job description. The summary section 58 further includes, in this example, an email button 72, a location button 74, and a summary line 76 including high level information about the advertised job in bulleted format. The company logo 60 and the graphic 66 can be saved and used as a template for additional job ads.

Figure 4B:
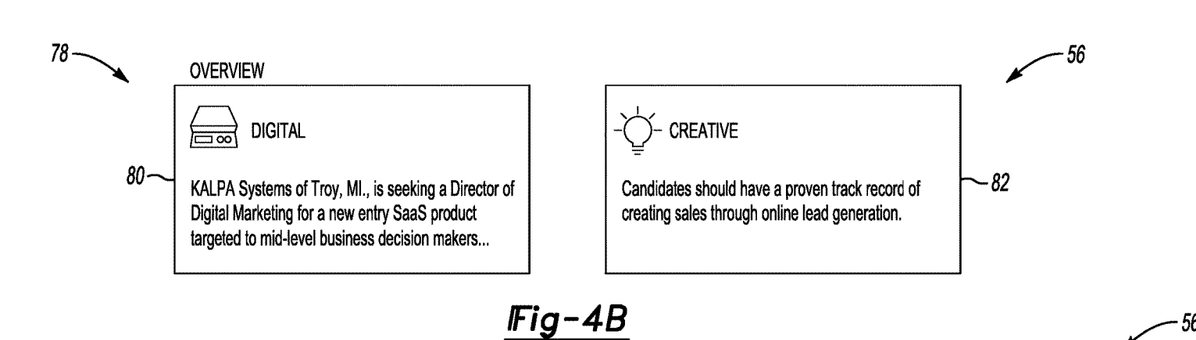
FIG. 4B is a view of a second aspect of the example visual job advertisement.

FIG. 4B illustrates an example overview section 78. The example overview section 78 includes first and second blocks 80, 82, each of which include an image, an associated keyword, and associated text from the original job description, as generally discussed above relative to the method 20 of FIGS. 2-3. The first and second blocks 80, 82 present easily digested information to the user. In this example, the user can immediately tell that the position is requires "digital" skills (from the first block 80) and the applicant must be "creative" (from the second block 82).

Figure 4C:
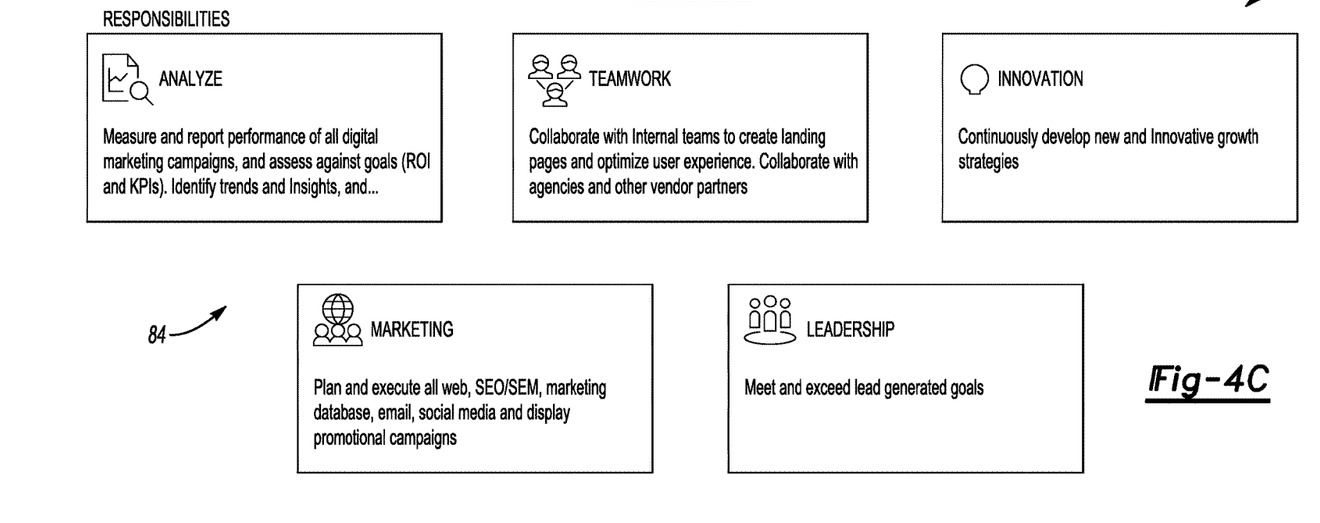
FIG. 4C is a view of a third aspect of the example visual job advertisement.

FIG. 4C illustrates an example responsibilities section 84. Like the overview section 78, the responsibilities section 84 includes a plurality of blocks (here five) containing an image, an associated keyword, and an associated line of text relating to the responsibilities of the job. Thus, the information relating to the job responsibilities is easily digested by the user.

Figure 4D:
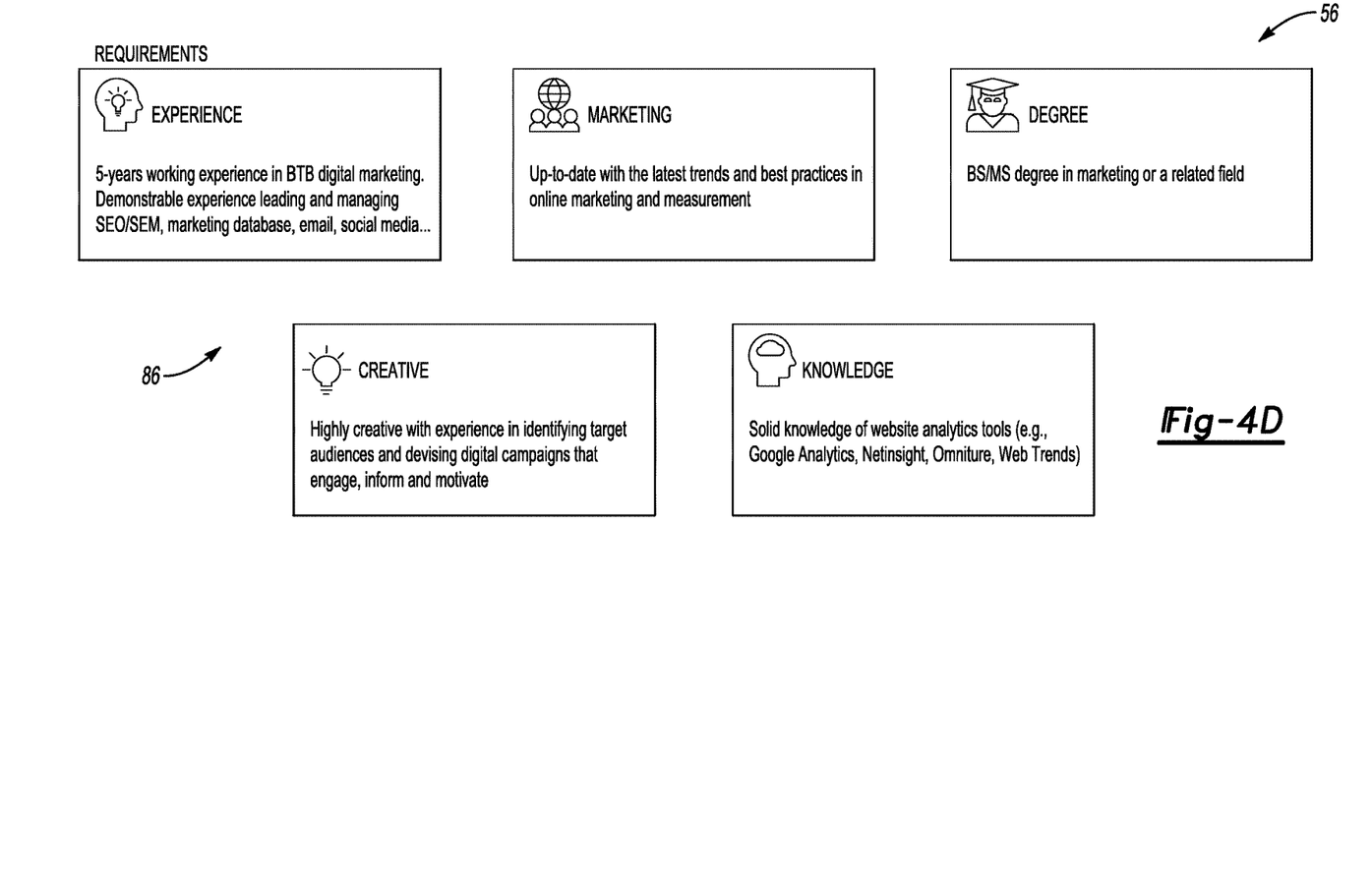
FIG. 4D is a view of a fourth aspect of the example visual job advertisement.

FIG. 4D illustrates an example requirements section 86. Like the overview and responsibilities sections 78, 84, the requirements section 86 also includes a plurality of blocks (here five) containing an image, an associated keyword, and an associated line of text relating to the requirements of the position. Again, the information relating to requirements of the job is easily digested.

Figure 4E:
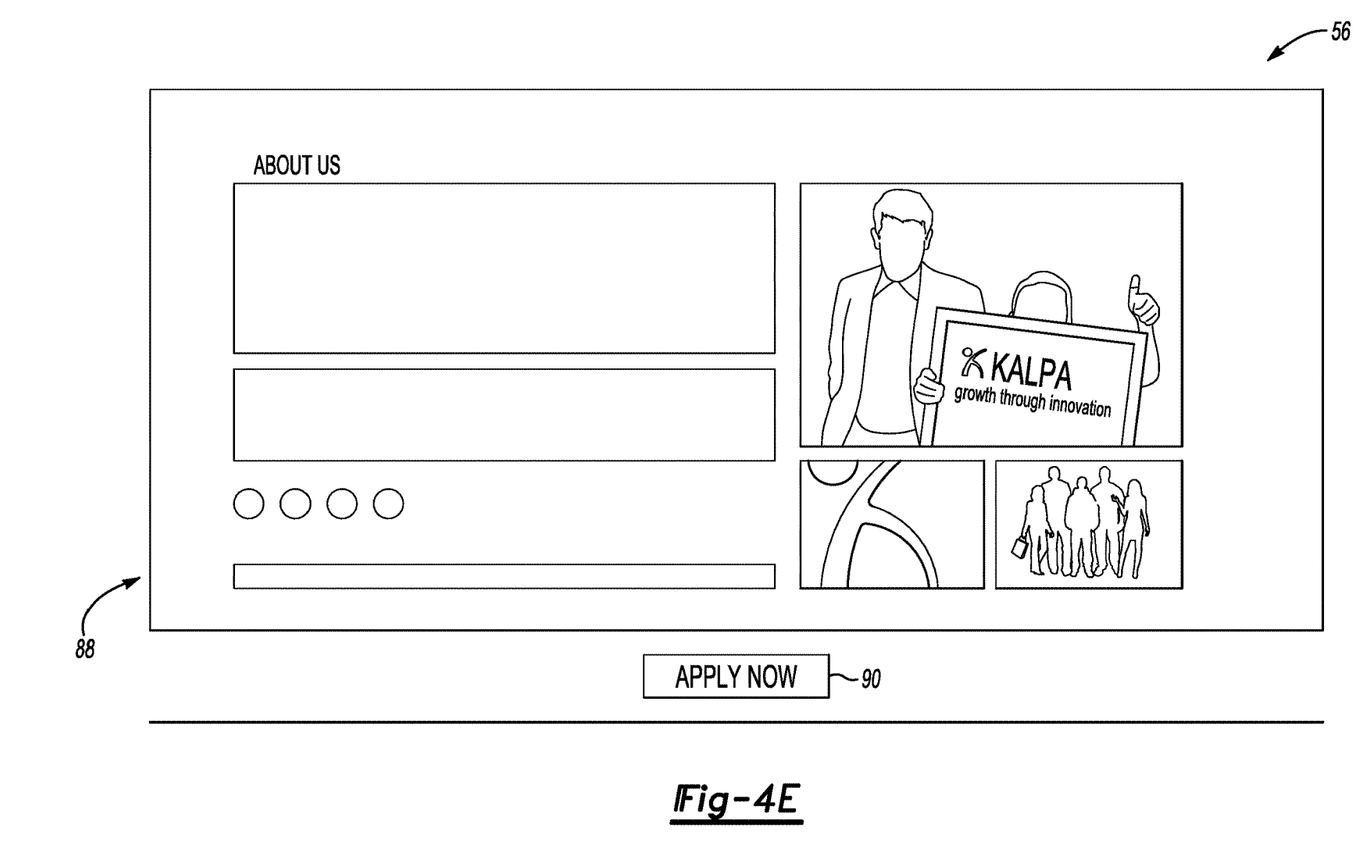
FIG. 4E is a view of a fifth aspect of the example visual job advertisement.

Finally, FIG. 4E illustrates an example about us section 88 in which the company associated with the job advertisement 56 can include information about their company. The about us section 88 can be stored and saved as a template for use with all job ads, or can be customized. In this example, the about us section 88 also includes an "apply now" button 90, which has the same function as the "apply now" button 68.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system for creating a job advertisement, comprising:
a first computing device; and
a second computing device in communication with the first computing device,
wherein the second computing device comprises a memory storing instructions that, when executed by a processor of the second computing device, causes the second computing device to perform a method, the method comprising:
receiving, from the first computing device, an input of text including a plurality of sentences describing a job;
identifying keywords within the plurality of sentences by comparing the input of text with a predefined table of keywords;
from the plurality of sentences, grouping all sentences having a first common keyword into a first sentence group and all sentences having a second common keyword into a second sentence group,
wherein the first common keyword and the second common keyword is (1) one of the identified keywords and (2) located in each respective sentence before any other keywords of the identified keywords within the respective sentence, wherein at least one sentence from each of the first sentence group and the second sentence group contains a plurality of keywords that are each of the identified keywords;
assigning an image to each of the first sentence group and the second sentence group, each of the assigned images being representative of the first common keyword and the second common keyword, respectively;
creating a job advertisement, the job advertisement containing a first and second block, wherein the first block comprises (1) the first common keyword, (2) the sentences having the first common keyword grouped into the first sentence group, and (3) the image assigned to the first sentence group, wherein the second block comprises (1) the second common keyword, (2) the sentences having the second common keyword grouped into the second sentence group, and (3) the image assigned to the second sentence group; and
hosting the job advertisement such that the job advertisement is accessible via the Internet.

2. The system as recited in claim 1, wherein the table of keywords includes similar keywords.

3. The system as recited in claim 1, wherein the first computing device includes a personal computer, a laptop, a tablet, or a mobile device.

4. A method for creating a job advertisement, comprising:
receiving, by a second computing device from a first computing device, an input of text describing a job, the text including a plurality of sentences;
identifying, by the second computing device, keywords within the plurality of sentences by comparing the input of text with a predefined table of keywords;
from the plurality of sentences, grouping, by the second computing device, all sentences having a first common keyword into a first sentence group and all sentences having a second common keyword into a second sentence group,
wherein the first common keyword and the second common keyword is (1) one of the identified keywords and (2) located in each respective sentence before any other keywords of the identified keywords within the respective sentence, wherein at least one sentence from each of the first sentence group and the second sentence group contains a plurality of keywords that are each of the identified keywords;
assigning, by the second computing device, an image to each of the first sentence group and the second sentence group, each of the assigned images representative of the first common keyword and the second common keyword, respectively;
creating, by the second computing device, outputting a job advertisement, the job advertisement containing a first and second block, wherein the first block comprises (1) the first common keyword, (2) the sentences having the first common keyword grouped into the first sentence group, and (3) the image assigned to the first sentence group, wherein the second block comprises (1) the second common keyword, (2) the sentences having the second common keyword grouped into the second sentence group, and (3) the image assigned to the second sentence group
hosting, by the second computing device, the job advertisement such that the job advertisement is accessible via the Internet.

5. The method as recited in claim 4, wherein the table of keywords includes similar keywords.

6. The method as recited in claim 4, wherein the second computing device is a server.

7. The method as recited in claim 6, wherein the server receives the input of text from one of a personal computer, a laptop, a tablet, and a mobile device.

\* \* \* \* \*